(12) United States Patent
Refuah et al.

(10) Patent No.: US 7,596,609 B1
(45) Date of Patent: Sep. 29, 2009

(54) WWW ADDRESSING

(75) Inventors: Aviv Refuah, Tel-Aviv (IL); Gil Dayagi, Zichron-Yaacov (IL); Roby Roth, Haifa (IL)

(73) Assignee: Net-Express, Ltd., Tel-Aviv (IL)

( * ) Notice: Subject to any disclaimer, the term of this patent is extended or adjusted under 35 U.S.C. 154(b) by 0 days.

(21) Appl. No.: 09/529,792

(22) PCT Filed: Jan. 28, 1999

(86) PCT No.: PCT/IL99/00055

§ 371 (c)(1),
(2), (4) Date: Sep. 27, 2000

(87) PCT Pub. No.: WO99/39280

PCT Pub. Date: Aug. 5, 1999

(30) Foreign Application Priority Data

Jan. 30, 1998 (IL) .................... 123129

(51) Int. Cl.
*G06F 15/16* (2006.01)
(52) U.S. Cl. .................... 709/218
(58) Field of Classification Search ......... 709/201–203, 709/216–219, 245; 707/1–5, 10, 100–104, 707/7
See application file for complete search history.

(56) References Cited

U.S. PATENT DOCUMENTS

| | | |
|---|---|---|
| 2,769,024 A | 10/1956 | Del Riccio et al. |
| 4,870,579 A | 9/1989 | Hey |
| 4,996,642 A | 2/1991 | Hey |
| 5,105,268 A | 4/1992 | Yamanouchi et al. |
| 5,446,891 A | 8/1995 | Kaplan et al. |
| 5,577,109 A | 11/1996 | Stimson et al. |
| 5,644,724 A | 7/1997 | Cretzler |
| 5,671,342 A | 9/1997 | Millier et al. |
| 5,721,827 A | 2/1998 | Logan et al. |
| 5,721,902 A * | 2/1998 | Schultz .................... 707/4 |
| 5,722,067 A | 2/1998 | Fougnies et al. |
| 5,727,950 A | 3/1998 | Cook et al. |
| 5,732,219 A | 3/1998 | Blumer et al. |
| 5,737,734 A * | 4/1998 | Schultz .................... 707/5 |
| 5,742,768 A | 4/1998 | Gennaro et al. |
| 5,745,556 A | 4/1998 | Ronen |
| 5,749,075 A | 5/1998 | Toader et al. |

(Continued)

FOREIGN PATENT DOCUMENTS

EP 0387226 A1 * 12/1990

(Continued)

OTHER PUBLICATIONS

M. Duerst "Internationzlization of Domain Names" Jul. 1997.*

(Continued)

*Primary Examiner*—Douglas B Blair
(74) *Attorney, Agent, or Firm*—Ostrager Chong Flaherty & Broitman P.C.

(57) ABSTRACT

A method of WWW page retrieval from a web site, comprising entering information associated with the site; and directly displaying said page, using a browser, without any additional user intervention. Preferably, the information is in a non-Latin language. Alternatively or additionally, the information does not meet domain name specifications, for example, being in a free-form format.

42 Claims, 2 Drawing Sheets

U.S. PATENT DOCUMENTS

| | | | |
|---|---|---|---|
| 5,761,280 A | 6/1998 | Noonen et al. | |
| 5,761,499 A | 6/1998 | Sonderegger | |
| 5,764,906 A | 6/1998 | Edelstein et al. | 709/219 |
| 5,768,521 A | 6/1998 | Dedrick | |
| 5,768,578 A * | 6/1998 | Kirk et al. | 707/100 |
| 5,769,906 A | 6/1998 | Kremer et al. | |
| 5,774,664 A * | 6/1998 | Hidary et al. | 725/110 |
| 5,794,210 A | 8/1998 | Goldhaber et al. | |
| 5,796,832 A | 8/1998 | Kawan | |
| 5,799,063 A | 8/1998 | Krane | |
| 5,806,043 A | 9/1998 | Toader | |
| 5,812,776 A | 9/1998 | Gifford | 709/217 |
| 5,815,665 A | 9/1998 | Teper et al. | |
| 5,819,092 A | 10/1998 | Ferguson et al. | |
| 5,848,396 A | 12/1998 | Gerace | |
| 5,852,812 A | 12/1998 | Reeder | |
| 5,862,325 A * | 1/1999 | Reed et al. | 709/201 |
| 5,878,219 A | 3/1999 | Vance, Jr. et al. | 709/217 |
| 5,884,262 A | 3/1999 | Wise et al. | |
| 5,892,919 A | 4/1999 | Nielsen | |
| 5,898,830 A * | 4/1999 | Wesinger et al. | 713/201 |
| 5,898,835 A | 4/1999 | Truong | |
| 5,902,252 A | 5/1999 | Hohlfeld et al. | |
| 5,902,353 A * | 5/1999 | Reber et al. | 709/219 |
| 5,903,729 A * | 5/1999 | Reber et al. | 709/219 |
| 5,907,680 A | 5/1999 | Nielsen | 709/228 |
| 5,911,145 A | 6/1999 | Arora et al. | |
| 5,915,093 A | 6/1999 | Berlin et al. | |
| 5,920,848 A | 7/1999 | Schutzer et al. | |
| 5,958,008 A | 9/1999 | Pogrebisky et al. | |
| 5,968,125 A | 10/1999 | Garrick et al. | |
| 5,970,477 A | 10/1999 | Roden | |
| 5,974,453 A | 10/1999 | Andersen et al. | 709/220 |
| 5,987,440 A | 11/1999 | O'Neil et al. | |
| 5,987,506 A | 11/1999 | Carter et al. | |
| 5,991,735 A | 11/1999 | Gerace | |
| 6,009,459 A | 12/1999 | Belfiore et al. | 709/203 |
| 6,021,496 A | 2/2000 | Dutcher et al. | |
| 6,023,698 A | 2/2000 | Lavey, Jr. et al. | |
| 6,029,195 A | 2/2000 | Herz | |
| 6,035,334 A | 3/2000 | Martin et al. | |
| 6,061,738 A * | 5/2000 | Osaku et al. | 709/245 |
| 6,070,157 A * | 5/2000 | Jacobson et al. | 707/1 |
| 6,097,441 A | 8/2000 | Allport | |
| 6,098,065 A | 8/2000 | Skillen et al. | |
| 6,101,482 A | 8/2000 | DiAngelo et al. | |
| 6,151,624 A | 11/2000 | Teare et al. | |
| 6,199,054 B1 | 3/2001 | Khan et al. | |
| 6,243,816 B1 | 6/2001 | Fang et al. | |
| 6,275,824 B1 | 8/2001 | O'Flaherty et al. | |
| 6,292,551 B1 | 9/2001 | Entman et al. | |
| 6,310,873 B1 | 10/2001 | Rainis et al. | |
| 6,332,158 B1 * | 12/2001 | Risley et al. | 709/219 |
| 6,356,936 B1 | 3/2002 | Donoho et al. | |
| 6,397,219 B2 * | 5/2002 | Mills | 707/10 |
| 6,446,261 B1 | 9/2002 | Rosser | |
| 6,453,335 B1 | 9/2002 | Kaufmann | |
| 6,480,850 B1 | 11/2002 | Velduisen | |
| 6,507,872 B1 * | 1/2003 | Geshwind | 709/236 |
| 6,546,002 B1 | 4/2003 | Kim | |
| 6,546,399 B1 * | 4/2003 | Reed et al. | 707/104.1 |
| 6,556,217 B1 | 4/2003 | Makipaa et al. | |
| 6,571,279 B1 | 5/2003 | Herz et al. | |
| 6,574,629 B1 | 6/2003 | Cooke, Jr. et al. | |
| 6,640,284 B1 | 10/2003 | Shaw et al. | |
| 6,668,177 B2 | 12/2003 | Salmimaa et al. | |
| 6,735,701 B1 | 5/2004 | Jacobson | |
| 6,853,993 B2 * | 2/2005 | Ortega et al. | 707/5 |
| 7,240,022 B1 | 7/2007 | Bistriceanu et al. | |
| 7,334,013 B1 | 2/2008 | Calinov et al. | |
| 2001/0011222 A1 | 8/2001 | McLauchlin et al. | |
| 2002/0184534 A1 * | 12/2002 | Rangan et al. | 713/201 |
| 2005/0203835 A1 | 9/2005 | Nhaissi et al. | |

FOREIGN PATENT DOCUMENTS

| | | |
|---|---|---|
| EP | 0 643 541 A2 | 3/1995 |
| EP | 0 749 081 | 11/1998 |
| EP | 1051683 | 11/2000 |
| GB | 2312975 | 11/1997 |
| JP | HEI10-21259 | 1/1989 |
| JP | HEI9-305518 | 11/1997 |
| JP | HEI9-319767 | 12/1997 |
| WO | WO 96/23265 | 8/1996 |
| WO | 96/42041 | 12/1996 |
| WO | WO 96/42041 | 12/1996 |
| WO | WO 97/07656 | 3/1997 |
| WO | 97/19564 | 5/1997 |
| WO | WO 97/19564 | 5/1997 |
| WO | WO 97/26612 | 7/1997 |
| WO | WO 97/31490 | 8/1997 |
| WO | WO 97/41673 | 11/1997 |
| WO | WO 98/04088 | 1/1998 |
| WO | 9826381 | 6/1998 |
| WO | WO 98/53581 | 11/1998 |
| WO | WO 99/39275 | 8/1999 |
| WO | WO 99/39281 | 8/1999 |
| WO | WO 00/05684 | 2/2000 |
| WO | WO 01/06393 | 1/2001 |

OTHER PUBLICATIONS

Cummings, R, "A URL Alternative" ,Sep. 12,1997, keyword.com press release.*

"Google Beta", Dec. 2, 1998, http://web.archive.org/web/19981202230410/http://www.google.com/.*

Takada, Toshihiro; "Multilingual information exchange through the World-Wide Web"; Computer Networks and ISDN Systems; vol. 27; No. 2; pp. 235-241; Nov. 1, 1994.

Hahn, Mark; "Uniform Resource Locators"; Edpacs; vol. 23; No. 6; pp. 8-13; Dec. 1, 1995.

Davison, A.; "A Graphical Internet Chat;" Web Techniques; Jan. 1998; Miller Freeman; USA; vol. 3; No. 1; pp. 54-57; XP002117568.

Duerst, M.; "Internationalization of Domain Names;" Dec. 10, 1996; pp. 1-11; Retrieved from Internet: <http://www.w3.org/International/draft-duerst-dns-i18n-00.txt>.

Falk, A. et al.; "PAWS: an Agent for WWW-Retrieval and Filtering;" Apr. 22, 1996; Proceedings of the International Conference on the Practical Application of Intelligent Agents and Multi-Agent Technology; pp. 169-179; XP002037595.

Kamba, T. et al.; "Anatagonomy: A Personalized Newspaper on The World Wide Web;" Jan. 1, 1997; International Journal of Human-Computer Studies; vol. 46; pp. 789-803; XP002086827.

Yergeau, P. et al.; "Internationalization of URLs;" Sep. 9, 1996; pp. 1-3; Retrieved from Internet: <http://www.alis-com:8085/~yergeau/url-00.html>.

Auric Web Systems, Inc.; Retrieved from Internet: <http://www.auricweb.com> [downloaded on Jun. 3, 1998].

Auric Web Systems "The Intercard System. Prepaid Internet Access Cards", Auric Web Systems, 17 P., 1998.

Davies et al. "Networked Information Management", BT Technology Journal, 15(2): 194-208, 1998.

Estabrook "Sams' Teach Yourself Microsoft Internet Explorer 4 in 24 Hours", Sams.Net Publishing, Hour 6 & 9: 83-85, 131-132, 1997.

Lee "Microsoft Internet Explorer PowerToys", The Naked PC Newsletter (TNPC), 3 P., 1998.

Wong "Web Client Programming With Perl", O'Reilly Online Catalog, 5 P., 1997. Retrieved From the Internet: URL: http://www.oreilly.com/openbook/webclient/ch01.html.

Davis, N, Revett,M, "Networked Information Management", BT Technology J, Springer, vol. 15, No. 2, Apr. 1, 1998, pp. 148-208, Dordrecht, NL.

Wong, Clinton, "Web Client Programming with Perl", O'Reilly ISBN 1-56592-214-X, Mar. 1997, http://www.orielly.com/openbook/webclient/ch01.html.

Sakamoto et al, "URL Number (Hot Code) Converting Server on Internet", NTT Technical J, Oct. 1, 1997, vol. 9, No. 10, pp. 92-94.

Kikui et al, "Multiple Language Function in Navigation of Internet Information", Symp Application of Natural Lang Process, Information Processing Soc, Oct. 19, 1995, vol. 95, No. 6, pp. 97-105.

"*What Are Networks*", Internet Archive, Oct. 15, 1997, http://www.web.archive.org/web/19971015221524/www.netword.com/n/help/what.html.

Japanese Foreign Patent Office Action for Japanese Patent Application No. 2000-529668 dated Jul. 7, 2008.

Moran, Joseph, "Using Windows 98's Address Bar to its Potential".

Soria et al. "Cytosolic Calcium Oscillations and Insulin Release in Pancreatic Islets of Langerhans", Diabetes & Metabolism, 24: 37-40, 1998.

W3C, Line Mode Browser Commands, Dec. 9, 1996.

Schloss, R. J., "Novel Business Uses of Independently Created Hyperlinks in the World Wide Web: Basic Mechanism and Examples," Proceedings of the Annual Hawaii International Conference on System Sciences, 1996, pp. 137-146.

Canadian Patent Office Action dated Sep. 10, 2008, in Canadian patent application No. 2,319,750 to Net-Express Ltd., entitled "WWW Addressing".

European Patent Office Examination Report Dated Oct. 9, 2007, in European Patent Application No. 99 901 873.2 - 2221 to Net-Express Ltd., entitled "WWW Addressing".

European Patent Office Examination Report Dated Mar. 12, 2004, in European Patent Application No. 99 901 873.2 - 2221 to Net-Express Ltd., entitled "WWW Addressing".

International Search Report dated Nov. 18, 1999, in International Patent Application No. PCT/IL99/00055 entitled "WWW Addressing".

International Preliminary Examination Report dated May 11, 2000, in International Patent Application No. PCT/IL99/00055 entitled "WWW Addressing".

Written Opinion dated Jan. 5, 2000, in International Patent Application No. PCT/IL99/00055 entitled "WWW Addressing".

Invitation to Pay Additional Fees dated Jul. 2, 1999, in International Patent Application No. PCT/IL99/00055 entitled "WWW Addressing".

International Preliminary Examination Report dated May 22, 2000, in International Patent Application No. PCT/IL99/00056, entitled "Personalized Internet Interaction".

Written Opinion dated Dec. 2, 1999, in International Patent Application No. PCT/IL99/00056, entitled " Personalized Internet Interaction".

Invitation to Pay Additional Fees dated Jul. 2, 1999 in International Patent Application No. PCT/IL99/00056, entitled "Personalized Internet Interaction".

Examination Report dated Nov. 28, 2007, in European Patent Application No. 99 933 101.0 -1225, entitled " Internet Billing".

Supplementary European Search Report dated Jan. 23, 2007, in European Patent Application No. 99 933 101.0 -1225, entitled "Internet Billing".

Corrected International Search Report dated Apr. 26, 2000, in International Patent Application No. PCT/IL99/00399, entitled "Internet Billing".

International Search Report dated Feb. 8, 2000, in International Patent Application No. PCT/IL99/00399, entitled "Internet Billing".

International Preliminary Examination Report dated Jun. 26, 2001, in International Patent Application No. PCT/IL99/00399, entitled "Internet Billing".

Written Opinion dated Jul. 27, 2000, in International Patent Application No. PCT/IL99/00399, entitled "Internet Billing".

International Search Report dated Dec. 22, 1999, in International Patent Application No. PCT/IL99/00433, entitled "User Interface Method".

* cited by examiner

WWW ADDRESSING

FIELD OF THE INVENTION

The present invention relates to world wide web page retrieval and, in particular, to methods and apparatus for performing such retrieval using a minimally restrictive syntax.

BACKGROUND OF THE INVENTION

The World Wide Web (WWW) is a set of protocols that allow a user to download and upload pages of information between his computer and other computers, typically using a program called a browser. The usual mode of operation includes opening a browser, entering a URL (Uniform Resource Locator), and viewing the page fetched by the browser. The actual pages of information are located on physical host machines, each of which may be mapped to one or more domain names. Typically each domain is served by one host machine.

URL syntax is described in RFC 1630 ("Uniform Resource Identifiers in WWW"). The URL syntax relies heavily on the domain name space, as defined in RFCs 1034 ("Domain Names—Concepts and Facilities"), 1035 ("Domain Names Implementation and Specification") and 883 (Domain names—Implementation and Specification").

A network resource (host) is identified in the domain name space by a string containing 1 or more labels (each up to a maximum of 63 characters), separated by periods. The periods are intended to define and outline the hierarchical structure of domain name space. Although RFC 1034 permits the use of 8-bit binary encoding, it is suggested that applications use 7 bit ASCII for naming. Further, the suggested and currently implemented (de facto) naming scheme uses labels consisting only of alphanumeric characters from the Latin (ISO Latin 1) Character set plus the hyphen character. A valid name must start with a letter and the rest of the name should contain only letters, digits or hyphens.

Thus, the naming conventions for domains (and consequently sites and URLs) are rather restricted. Typically, there is an attempt to identify a particular site with a particular site owner, so that the address is meaningful. For example, IBM has a web site with the address "http://www.ibm.com" (".com" indicates commercial), Microsoft has the address "http://www.microsoft.com" but Microsoft Network has the address of "http://www.msn.com". The restrictions make it easy to create a one-to-one mapping between web addresses and a particular site. However, these addresses must be entered accurately. Any mistake will result in the site not being located.

In many countries, English is not a native tongue. Meaningful WWW addresses in such countries are typically created by transliterating the name of the site owner into Latin letters. Unfortunately, many languages do not have an accepted and widely known standard of transliteration. Thus, there may be several plausible transliterations for a single name, resulting in several possible meaningful addresses, only one of which is correct.

Another problem is that the current address name scheme is not user friendly. First, in countries in which most people are not English speaking, the use of Latin letters and/or English spelling conventions may be a burden to many users, especially non-experienced users. In addition, in many cases there is no direct relationship between the name of the site owner and the address of his site. Guessing the address is typically not an option. Further, in countries where the name is transliterated, even if a meaningful address is created (such as for IBM, above) there is still no guarantee that a casual user will correctly transliterate that name from his native language. In many cases, the site addresses can be used as mnemonics, i.e., once the address is known, its content makes it easy to remember. However, it is often impossible to reconstruct the correct address from the name of the site owner.

For these and other reasons, search engines and WWW directories have been developed, in which a user enters a name and/or other information regarding the site owner and a WWW page containing a list of possible site addresses is generated and presented to the user. Some search engines allow the entry of non-Latin characters. In addition, various automated agents and SearchBots have been developed which serve as online search agents and which interface directly with the browser, for example, the WebTurbo software. In some browsers, an incorrectly entered name will automatically pull up a search page.

Some Web browsers allow a user to maintain a local list of preferred locations, which are stored and accessed by selection of a nickname and/or a description from a list, rather than by entering a complete URL. In some browsers, an incompletely typed URL may be automatically expanded by the addition of a standard suffix or postfix. Another helpful feature is automatic completion of URLs. If a URL has been previously used, entering the first few characters thereof will cause the entire URL to be suggested to a user.

The underlying addressing system in the Internet is based on numeric strings. However, in order to provide some measure of comfort, textual addresses, as described above, are used. A DNS (Domain Name Server) is a distributed application that translates textual addresses into numeric addresses. If the address is incorrectly formatted or incorrectly entered, it does not generate a proper numeric address. Rather it returns an output which generates an error message at the requester. The different DNS servers update each other with new mappings of textual addresses to numeric addresses.

Many network systems supply aliasing support and/or "hosts" files that contain associations between numeric strings and textual strings. In some systems, for example Microsoft Windows 95 with Hebrew Support, it is possible to enter and use (on the network, not on an external DNS) a host name including non-Latin characters. It should be noted that host names are also limited, for example, they cannot contain spaces.

M. Duerst, in WWW document "http://www.w3.org/international/draft-duerst-dns-i18n-00.txt" (a working draft), suggests introducing a new zero-level domain to allow the use of arbitrary characters from the Universal Character Set (ISO 10646), also known as Unicode, in domain names. Duerst suggests an implementation in which software with an internationalized user interface, such as a web browser will be responsible for conversions. The software would analyze the domain name, call the (DNS) resolver directly if the domain name conforms to the domain name syntax restrictions and otherwise encode the name according to the specifications described in the document. Duerst also suggests providing a separate look up service that programs will call if a domain name contains characters outside the allowed range. Francois Yergeau, in WWW document "http://www.alis.com:8085/~yergeau/url-00.html", suggests an 8-bit encoding for the Unicode, called UTF-8 (UCS Transformation Format 8), which preserves the full US-ASCII range, so that it is compatible with file systems, parsers and other software which relay on US-ASCII values but are transparent to other (8-bit) values.

SUMMARY OF THE INVENTION

It is an object of some embodiments of the present invention, to allow a user to retrieve a WWW page using a native language, other than English and optionally using non-Latin characters, such as Cyrillic, Hebrew and Arabic.

It is an object of some preferred embodiments of the invention to allow flexible naming of Domains and URLs, preferably using non-Latin characters. Preferably, the length is not substantially limited in length.

It is an object of some preferred embodiments of the invention to allow a user to enter partial information regarding a site owner, preferably without imposing an order on the information. Preferably, such information directly retrieves a home page, which belongs to a site matching the entered information.

It is an object of some preferred embodiments of the invention, to allow a user to directly access WWW pages, without requiring the user to recall long and/or obtuse URLs and/or without requiring the user to make selections and/or perform any additional procedure beyond what would have been required if the user had in fact typed the URL.

It is an object of some preferred embodiments of the invention to allow a user to surf the WWW using his native language, preferably, without requiring changes in existing hardware/software products.

In accordance with a preferred embodiment of the invention, a user enters a native language alias and/or name for a site owner and that input is converted into a numeric string address, so that data stored at the site can be retrieved. Preferably, the user enters the input into a standard portion of a browser, a location entry window, just as a standard URL would be entered. In accordance with one preferred embodiment of the invention, the input is converted by a DNS server. Preferably the DNS server directly translates the input to a numeric string. Alternatively, the DNS translates the input to a corresponding standard URL, which is then translated into a numeric string.

Alternatively, the input is translated into a standard URL by a local program which then transfers the URL to the browser. Alternatively, the browser passes the input to a program that performs the translation and transmits the generated URL to the Internet. Alternatively, a proxy server translates the input either to a numeric string or to a corresponding standard URL. Alternatively, a name server masquerades as a DNS server and converts non-standard names into standard names and/or IP addresses. Standard names are preferably passed to a standard DNS server.

In accordance with a preferred embodiment of the invention, there is provided a database which associates URLs and/or domain names with native language information and/or nicknames indicative of the site owners. Thus, a user can enter information which is associated with the site owner, rather than a proper name or a transliteration thereof. In some preferred embodiments of the invention, a translator, when determining a mapping between a native language input and a standard URL, consults the database. Preferably, the translation is performed as a service and/or as a proxy service. Preferably, the database is maintained at a single location, external to the machine that requires the translation. Alternatively, there is more than one site at which the database or a portion thereof, is maintained. Alternatively, the database resides on the same machine as the translator. Thus, in some cases, distributed databases need to be kept up to date.

In a preferred embodiment of the invention, periodic updates are sent to all the machines and are automatically assimilated in a local copy of a database. Preferably, the update comprises only changes. Alternatively, the entire database is transferred as a replacement file. In accordance with a preferred embodiment of the invention, the local database operates as a cache, so that fewer "external" queries are required. Preferably, when attempting to match partial information with site related information, previously and/or recently used URLs are selected over unused URLs with a similar matching. It should be noted in this context, that as a result of the explosive growth of the Internet in the last few years, the event of a new domain name/URL address being added is more common than the event of an address being changed or deleted.

There is therefore provided in accordance with a preferred embodiment of the invention, a method of WWW page retrieval from a web site, comprising:

entering information associated with the site, which information is not a WWW address or a portion thereof; and directly displaying said page, using a browser, without any additional user intervention, beyond said entering, wherein said information is in a non-Latin language.

There is also provided in accordance with a preferred embodiment of the invention, a method of WWW page retrieval from a web site, comprising:

entering information associated with the site, which information is not a WWW address or a portion thereof; and directly displaying said page, using a browser, without any additional user intervention, beyond said entering, wherein directly displaying comprises analyzing said information using user-dependent information.

There is also provided in accordance with a preferred embodiment of the invention, a method of WWW page retrieval from a web site, comprising:

entering information associated with the site, which information is not a WWW address or a portion thereof; and directly displaying said page, using a browser, without any additional user intervention, beyond said entering, wherein said information is entered into a URL entry field in said browser.

There is also provided in accordance with a preferred embodiment of the invention, a method of WWW page retrieval from a web site, comprising:

entering information associated with the site, which information is not a WWW address or a portion thereof; and directly displaying said page, using a browser, without any additional user intervention, beyond said entering, wherein said page is selected responsive to a geographical location at which said information is entered.

In a preferred embodiment of the invention, said information is in a non-Latin language.

In a preferred embodiment of the invention, said information does not meet domain name specifications. Alternatively or additionally, said information does not meet URL specifications. Alternatively or additionally, said information comprises a plurality of words. Alternatively or additionally, said information comprises a field identifier and a field-match value. Alternatively or additionally, said information is associated with an owner of the site. Alternatively or additionally, said information comprises a partial street address of said owner. Alternatively or additionally, said information comprises a telephone number of said owner.

In a preferred embodiment of the invention, the method comprises analyzing said partial information to determine a single translation thereof. Preferably, analyzing comprises correcting spelling in said information. Preferably, correcting spelling comprises correcting for at least one transliteration error.

In a preferred embodiment of the invention, analyzing comprises applying natural language recognition on said information. Alternatively or additionally, analyzing comprises blocking access to certain types of sites. Alternatively or additionally, said translation comprises a only domain name. Preferably, said translation comprises a URL. Alternatively or additionally, said association is determined using a database of associations.

Preferably, said database is at least logically associated with a particular user. Preferably, said database includes information regarding a particular user, which information is entered by said user, which page is selected for display responsive to said information and wherein said database is stored at a location remote from where the information is entered for display of said page.

Alternatively or additionally, said database comprises at least one association which is particular to said particular user. Preferably, analyzing comprises analyzing responsive to said at least one association. Alternatively or additionally, said at least one association is entered by said particular user. Alternatively or additionally, said at least one association is automatically generated responsive to a selection of a WWW page, from a plurality of suggested pages, by said particular user.

In a preferred embodiment of the invention, at least one association in said database is automatically generated responsive to a selection of a particular WWW page, from a plurality of suggested pages, by a plurality of users.

In a preferred embodiment of the invention, said database is at least logically associated with a translation server, which utilizes said database for translation.

In a preferred embodiment of the invention, said at least logical association comprises a physical association.

In a preferred embodiment of the invention, said analyzing is performed locally, where said page is displayed. Alternatively or additionally, said analyzing is performed remotely from where said page is displayed. Alternatively or additionally, said analyzing comprises determining a one-to-one mapping between said information and a translation. Alternatively or additionally, said analyzing utilizes a geographical location at which said information is entered.

In a preferred embodiment of the invention, said information is entered by a user in a same way in which a standard URL would be entered. Alternatively or additionally, said information is entered into a window overlaying said browser. Preferably, said window is overlaying a location window of said browser.

In a preferred embodiment of the invention, said information is entered in a language not supported by said browser. Alternatively or additionally, said information is entered in a font not supported by said browser. Alternatively or additionally, directly displaying said page, comprises automatically providing password information for accessing said page. Preferably, a plurality of such passwords are stored in a password database associated with said user.

There is also provided in accordance with a preferred embodiment of the invention, a server comprising:
a database associating business information with WWW sites;
a translator which converts an input comprising business information into a WWW site address, using said database; and
a user information database,
wherein said translator utilizes said user information database for the conversion.

Preferably, said user database comprises a user's previous desired conversions. Alternatively or additionally, said user database comprises a user's geographical location.

There is also provided in accordance with a preferred embodiment of the invention, a system including a server as described above and a client which provides said input to said server and displays a WWW page indicated by said address.

There is also provided in accordance with a preferred embodiment of the invention, a server comprising:
a database associating information with WWW sites;
a user information database; and
a translator which converts input information provided to it, into a WWW site address, using said database and said user database.

Preferably, said input information comprises business information. Alternatively or additionally, said input information comprises domain name information. Alternatively or additionally, said input information comprises URL information.

There is also provided in accordance with a preferred embodiment of the invention, a software unit for integrating with an existing browser, comprising:
a first module adapted to be integrated with said browser and which adds at least one functionality to a user interface of said browser; and
a second module which communicates with a remote site having stored therein information,
wherein said second module uses said communication to retrieve at least some of said information to perform said added functionality.

Preferably, said functionality comprises sending an e-mail to an owner of a site and wherein said information comprises an association between a site and an e-mail address of the owner thereof. Alternatively or additionally, said functionality comprises a poll answering interface and wherein said information comprises at least one poll question to display. Alternatively or additionally, said functionality comprises translating partial information into WWW addresses and wherein said information comprises an association between partial information and WWW addresses.

In a preferred embodiment of the invention, the unit comprises a third module which updates said information responsive to input entered at said browser. Alternatively or additionally, said remote site performs an operation requested by said functionality, responsive to said user information database. Preferably, said remote site performs a matching between partial entered information and a business information database, responsive to information associated with a user of said browser. Alternatively or additionally, said remote site sends credit card information to a second remote site, responsive to said functionality and to said information associated with a user of said browser.

In a preferred embodiment of the invention, said functionality does not affect a visual format of a GUI (Graphical User Interface) of said browser, when said functionality is not in use. Alternatively, said functionality does not affect a visual format of a GUI (Graphical User Interface) of said browser, when said functionality is in use.

There is also provided in accordance with a preferred embodiment of the invention, a software unit comprising:
a first module which receives, from a browser, a WWW address which does not meet WWW addressing standards;
a second module which translates said address into a WWW address which meets WWW addressing standards; and
a third module which instructs said browser to display a page associated with said translated WWW address.

Preferably, said second module performs said translation using a remote translation service. Alternatively or additionally, said first module impersonates a TCP/IP stack. Alternatively or additionally, said first module impersonates a HTTP service handler. Alternatively or additionally, said first module impersonates a DNS server. Alternatively or additionally, said first module steals a user input from said browser. Alternatively or additionally, said third module utilizes an OLE/DDE service. Alternatively or additionally, said translated address comprises a complete URL. Alternatively or additionally, said unit comprises an upload module which provides site accessing information to uploaded to a remote computer. Alternatively or additionally, said unit comprises a page generation module which generates a WWW page in response to said non-standard WWW address. Preferably, said generated WWW page comprises a list of possible WWW pages.

Alternatively or additionally, said generated page comprises a directory of a plurality of pages in a particular site. Alternatively or additionally, said generated page comprises at least one advertisement. Alternatively or additionally, said generated page displays a request for more information. Alternatively or additionally, said generated page is generated locally, i response to a request for a remote WWW address.

In a preferred embodiment of the invention, said unit comprises a messaging module which displays a message responsive to non-availability of a required WWW page. Alternatively or additionally, said unit comprises an e-mail module which corrects e-mail addresses, responsive to information associated with e-mail addressees.

In a preferred embodiment of the invention, said unit is a separately compiled software.

There is also provided in accordance with a preferred embodiment of the invention, a computer readable medium having encoded thereon a representation of a software unit as described above.

There is also provided in accordance with a preferred embodiment of the invention, a method of WWW page retrieval from a web site, comprising:

entering information associated with the site;

spell correcting said information; and displaying a page responsive to said information, using a browser.

Preferably, spell correcting comprises correcting transliteration errors. Preferably, said information comprises a URL.

There is also provided in accordance with a preferred embodiment of the invention, a method of accessing an Internet resource, comprising:

entering information, which information does not comprise even a partial address for said resource; and accessing said resource responsive to said information, without any additional user intervention, beyond said entering, wherein said resource comprises a news group.

There is also provided in accordance with a preferred embodiment of the invention, a method of e-mail addressing, comprising:

entering an incorrect e-mail address, which does not form an alias, a portion or a nickname of a valid e-mail address;

automatically correcting said address, using information at a first, remote, location; and sending an e-mail message to a second remote location, via an Internet, using said corrected address.

Preferably, said incorrect e-mail address comprises information associated with a desired e-mail addressee. Preferably, said information comprises at least a portion of a geographical address. Alternatively or additionally, said information comprises at least a portion of a telephone number.

BRIEF DESCRIPTION OF THE DRAWINGS

The present invention will be more clearly understood from the following detailed description of the preferred embodiments of the invention and from the attached drawings, in which.

DETAILED DESCRIPTION OF THE PREFERRED EMBODIMENTS

One aspect of the present invention relates to a method of enabling a user to enter a substantially free-form designation of a WWW site, preferably in the user's native language, and directly obtain the information from the site, without the necessity of using a search engine and/or an exact site address.

FIGS. 1-5 are schematic block diagrams of several methods of configuring a system in accordance with this aspect of the present invention. FIG. 6 is a flowchart of a method of obtaining a WWW page, in accordance with a preferred embodiment of the invention. A user enters the information by which he wishes to obtain a WWW page (60). This information is preferably matched to a database (62), as a result of which an IP address is generated (64). The page is then obtained automatically using the IP address and is preferably displayed on the user's computer (66). The various configurations of FIGS. 1-5, determine how and by what hardware each of these steps is performed.

Figure 1:
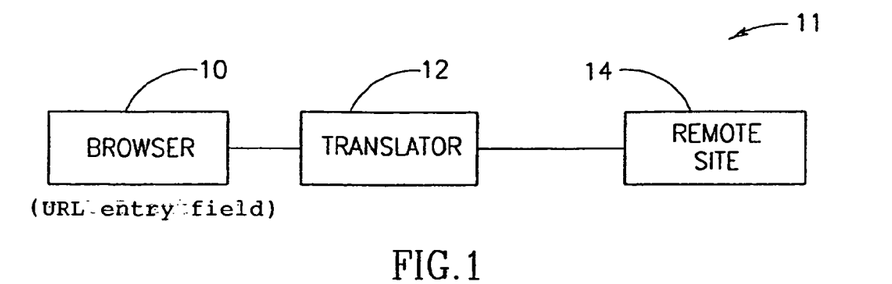
FIG. 1 is a schematic block diagram of a site translator configuration, in accordance with a preferred embodiment of the invention.

In FIG. 1, a system 11 includes a browser 10, at which a user enters his request, a translator 12 which aids in converting this request into an IP address and a remote site 14, which hosts a desired WWW page. In a preferred embodiment of the invention, the translator masquerades as a TCP/IP stack (preferably Winsock in Windows 95). Alternatively, the translator is a proxy for the client machine. Such a proxy may be connected by a local network to the client machine and/or may be at the user's ISP (Internet Service Provider) and/or may be a remote machine, anywhere on the Internet. It should be noted that, in some preferred embodiments of the invention, all communications, in both directions, pass through the translator. Alternatively, only outgoing communications from the browser will go through the translator.

Figure 2:
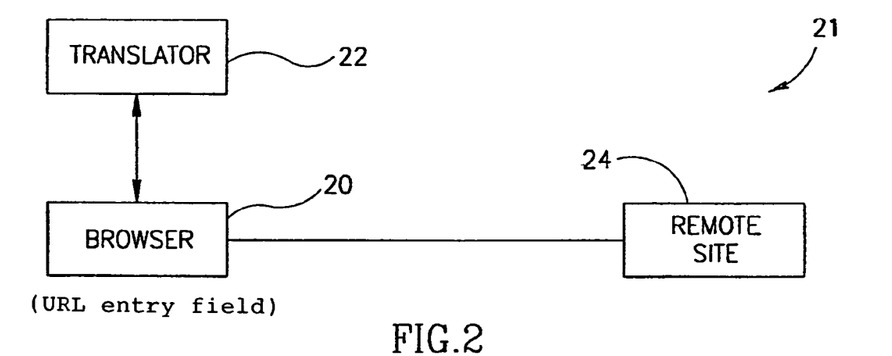
FIG. 2 is a schematic block diagram of a site translator configuration, in accordance with another preferred embodiment of the invention.

In FIG. 2, a system 21 includes a translator 22 which is in direct communication with a browser 20 and a remote site 24 which is in direct communication with browser 20. In this embodiment of the invention, browser 20 communicates with a local translator, which converts free-form entered domain name addressing into standard URLs. In accordance with one preferred embodiment of the invention, the translator is integrated as a module of the browser. Alternatively or additionally, the connection to the translator is patched into the browser. Alternatively or additionally, the translator communicates with the browser through existing hooks in the browser, such as the OLE/DDE protocol, under the Windows operating system. In a preferred embodiment of the invention, the browser contacts the translator if the entered address does not match certain criteria, such as form and character set.

In a preferred embodiment of the invention, the translator uses a local translation database. Preferably, this database is updated by an external server, either automatically, or by a user request. In a preferred embodiment of the invention, a user may enter a personal preference for an association between a URL/domain name and partial and/or native language information. In one preferred embodiment of the invention, the local database comprises host alias files. In one preferred embodiment of the invention, one or more of these files are replaced by updated files. Alternatively, the translator preferably includes an automatic application that downloads updates from a central server and updates the local files.

Figure 3:
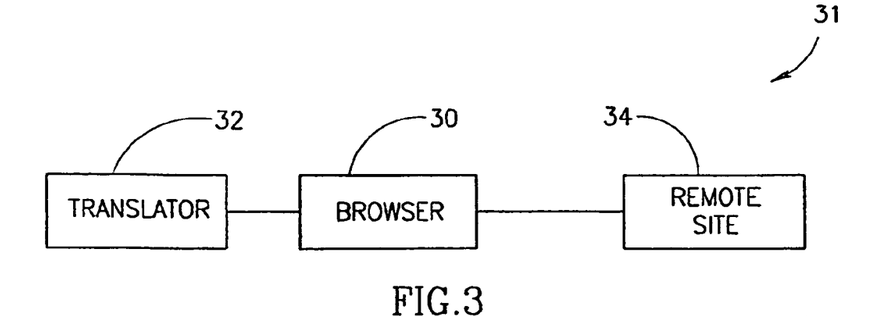
FIG. 3 is a schematic block diagram of a site translator configuration, in accordance with another preferred embodiment of the invention.

FIG. 3 illustrates a system 31, in which a translator 32 acts as a front end to a browser 30, which downloads Web pages from a remote site 34. In accordance with one preferred embodiment of the invention, translator 32 includes a separate input window, which is preferably overlaid on a portion of the browser window. Preferably, this separate window remains on top on the browser and at a fixed relationship to at least one feature of the browser display. In a preferred embodiment of the invention, this window provides font support and data entry support for non-Latin character sets, even if the underlying browser and/or operating system do not. Preferably, such support includes support for languages which are not entered as single characters from the left to the right, for example Hebrew and Arabic, which are entered right to left and Chinese pictograms, which are composed. Alternatively or additionally, translator 32 is hidden from the user, so that it appears to the user that he is working with and entering information directly into the browser. In one preferred embodiment of the invention, a transparent window is overlaid on the browser address entry window. Alternatively or additionally, the translator steals the keystrokes from the browser, preferably by changing the window focus through the operating system. In a preferred embodiment of the invention, the translator sends the keystrokes to the browser, so that they are displayed, but performs a translation of the keystrokes and instructs the browser to use the addressed obtained by translation and ignore what was typed. Alternatively, the translator only steals the "return" key and at that key, reads the location entered into the browser location window and performs the translation. In a preferred embodiment of the invention, the translator displays the translated URL and/or IP address. Preferably, this information is displayed in the browser location window. Alternatively, it is displayed in a status area associated with the browser and/or with the translator. In a preferred embodiment of the invention, both the original and the translated addresses are displayed side by side, for the user to learn.

Figure 4:
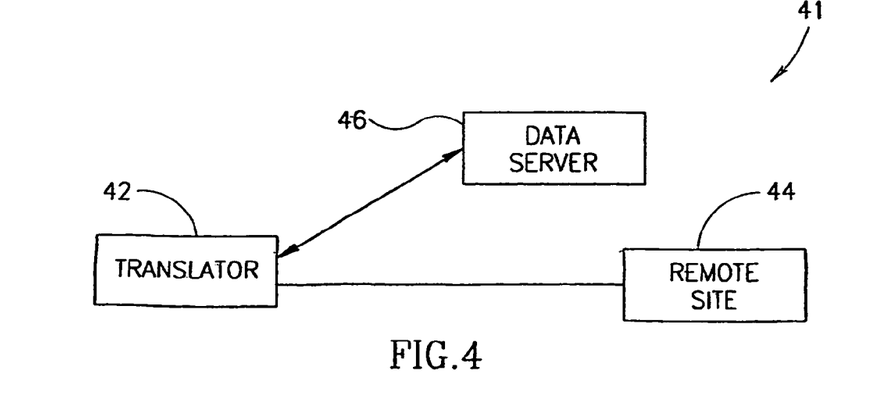
FIG. 4 is a schematic block diagram of a site translator configuration, including a data server, in accordance with another preferred embodiment of the invention.

FIG. 4 illustrates a connection between a translator 42 and a data server 46, in accordance with a preferred embodiment of the invention. In many of the above-described embodiments, translator 42 need not actually perform the translation itself. Rather, the input entered by the client is transmitted by translator 42 to a data server 46, which preferably performs the translation. Data server 46 returns a URL and/or an IP address to translator 42, which can then obtain data, either directly or through the browser, from a remote site 44.

Figure 5:
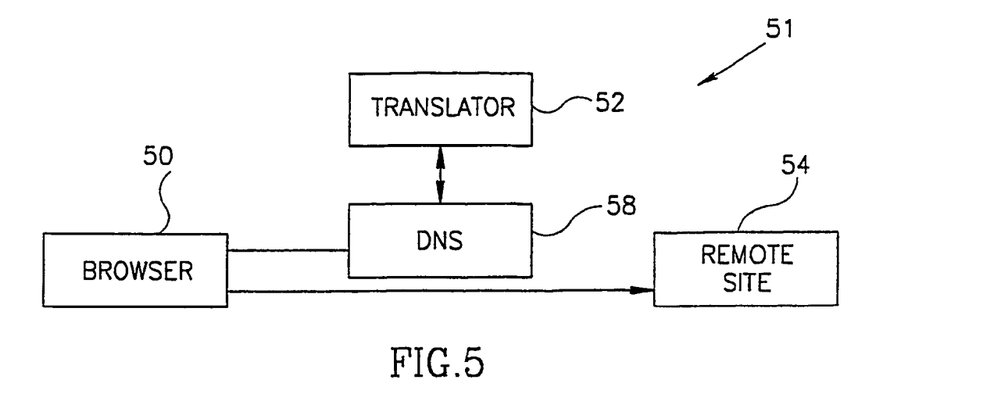
FIG. 5 is a schematic block diagram of a site translator configuration, including a domain name server, in accordance with another preferred embodiment of the invention.
Figure 6:
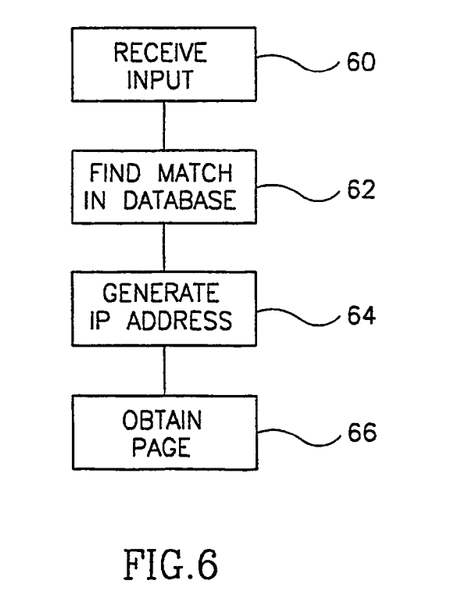
FIG. 6 is a flowchart of a method of obtaining a WWW page, in accordance with a preferred embodiment of the invention.

FIG. 5 illustrates the integration of a translator 52 with a domain name server 58, in accordance with a preferred embodiment of the invention. When a browser 50 desires to connect to a remote site 54, the browser (or an installed TCP/IP stack) sends the domain name to DNS server 58, to be translated into an IP address. In accordance with one preferred embodiment of the invention, DNS server 58 utilizes a translator 52 to perform address translation for domain names that do not meet certain criteria. Such a translator may be local to the name server, such as on a local network or may be a remote service, accessed through a dedicated line or through the Internet. Alternatively, the DNS may be modified to perform the translation, preferably using look-up tables, but possibly using a pattern matching system. In a preferred embodiment of the invention, a plurality of translators are arranged in a hierarchical manner, similar to domain name servers, so that if a name is not found on one translator, other translators are queried. Preferably, this hierarchical structure utilizes the configuration and protocols used for existing domain name servers.

In an alternative embodiment of the invention, addresses to be resolved are passed first or only to the translator. In one preferred embodiment of the invention, the translator acts as a DNS. Preferably, the translator is registered as a primary DNS. Preferably, the translator translates only non-standard domain names, and passes standard domain names to the DNS. Alternatively or additionally, the translator acts as a filter, which converts non-standard domain names and/or free-form information into standard domain names, which are then passed to the DNS to be converted into IP addresses. In one preferred embodiment of the invention, the translator is in the gateway to a DNS server local network.

In a preferred embodiment of the invention, where the non-standard URL must pass through standard components, the non-standard URL is preferably encoded so that it is not modified by such components, for example, by encoding the non-ASCII characters and/or by replacing empty spaces with fill characters. One example of a standard component is a browser, which may attempt to parse the input, instead of simply sending it to the DNS. Encoding may be required in order to avoid error detection and address completion mechanisms which may be implemented in a particular browser. Such encoding is preferably performed using a front end, such as described above and/or a patch to the browser.

In a preferred embodiment of the invention, the translator is used to convert the entire URL, not just the domain name, into a proper address. In some cases, a native language expression will map to a particular page at a remote site, the address of which the translator will be required to return to the browser. In a preferred embodiment of the invention, the DNS protocol is modified to allow the transmission of the entire address. Alternatively, a separate connection is opened between a translator portion resident at the browser and a translator portion resident at the DNS, through which connection such information is passed. Alternatively, two translators are used, one for the domain name portion and one for the rest of the URL. Preferably, both translators are provided with the same native language and/or free-form expression and one returns the IP address and one returns the rest of the URL. Preferably, these two translators are synchronized so that they provide a single complete URL. In a preferred embodiment of the invention where a proxy server is used, the proxy server can be used to split the URL and track its parts. Preferably, the proxy server provides a dummy IP address to the browser, when it is presented with a free form and/or native language expression and/or domain name by the browser. When that dummy address is detected by the proxy server, it may be replaced with the correct IP address and the correct other portions of the URL.

In a preferred embodiment of the invention, when a proper URL is passed to the translator, the translator returns it unchanged and/or passes it to a DNS to be translated. Alternatively, the address may be used as a key-word which is used by a user to indicate a site within a domain, for example, "www.microsoft.com software download".

In accordance with a preferred embodiment of the invention, the translator may perform one or more of the following functions:

(a) Correct spelling errors, especially those caused by transliteration errors. As a result, many near misses in site address entry will connect to the correct site.

(b) Accept words in any order. Preferably, these words are used to search a database in which each word and/or pattern is associated with a particular remote site.

(c) Find a site based on an (street/P.O. Box/e-mail) address of the site owner, and/or his telephone or fax numbers and/or a product, service name and/or trademark owned by the site owner and/or any particular information associated directly or indirectly with the site owner/operator. In a preferred embodiment of the invention, the (user's) focus is on the site itself and not on its owner. Thus, the information will be associated with the type/content/usage and/or information found in the site. In one example, the user may enter "freeware and software download center in Oakland" and the translator will locate a particular site and display it.

(d) Use field matching, for example "name=ibm".

(e) Request additional information.

(f) Generate a page with a list of possible WWW pages. Preferably, such a page will include only sites which are registered with a particular translation service. Preferably, the site owners will also register a graphical representation by which they wish to be displayed on the generated page. Such a page may also include advertisements. It should be appreciated that such a page may be generated locally, as a result of a local search, without actually sending any information out to the Internet. Thus, the page generation and display may be very rapid. In a preferred embodiment of the invention, the user will try out several of the sites and then indicate to the translator which site was the "correct" one. Thereafter, upon entering the same partial information, the site will be directly connected to. Alternatively or additionally, this selection will be used to generate a user profile and/or to aid in matching partial information with other sites. Preferably, the translator uploads these selections to the data server.

(g) Learn a user's particular associations. In a preferred embodiment of the invention, a local database is maintained in which each partial entry by a user is associated with the actual site that the user connected to. Thereafter, when the user enters the partial information, the site can be connected to without any additional input by the user. Alternatively, every such choice is registered with a remote translator, which, when it receives partial information, performs indexing responsive to the identity of the remote user. In a preferred embodiment of the invention, each user on a particular machine can set up a profile of partial information matching. Preferably, a user can actively register certain associations.

(h) Perform a matching operation based on the geographical location of the user. For example, entering "Pizza store" will generate a different web site connection, based on where the connection is from. For example, a user in Brighton, Mass. will be directed to a different pizza store from a user in downtown Boston, even if both stores belong to the same franchise. Preferably, a user enters his computer's location, during configuration and/or at the beginning of the session, so that the client computer transmits its location to the translator. Preferably, a resident portion of the translator performs this transmission. Alternatively to a geographical location, a logical location may be used. Alternatively or additionally, sites are located based on them being associated with a user profile. In a preferred embodiment of the invention, a user profile is defined based on the user belonging to a certain customer club. Alternatively or additionally, the profile may be generated responsive to his age and/or previous browsing habits.

(i) Perform an automatic web search and return the address of a single hit.

(j) Provide an alternative page in cases where a page cannot be found. Preferably, when such an alternative page is provided, the user is informed, either by the browser or by a special pop-up message window generated by a resident portion of the translator.

(k) Parse a natural language query, for example "get me a pizza store". Alternatively or additionally, a command language can be used, for example, SQL.

(l) Translate only a domain name and provide in response a list of the sites that are registered under that domain name. For example, entering "Microsoft Inc." could generate a list of sites in the domain "microsoft.com", which are registered with the translation service.

In a preferred embodiment of the invention, each native language name and/or index word is associated with a plurality of sites. For example, many sites will be associated with "pizza". However, a particular site is designated the default site, for use if there isn't enough information available to otherwise uniquely select a single site.

In accordance with one preferred embodiment of the invention, the translator or a portion thereof is embodied as an external box, which may be connected on a telephone line between a computer with a modem and a remote computer. Alternatively, it is integrated into the operating system of the user's computer.

In a preferred embodiment of the invention, the translator is embodied as a distributed system. In one example, the matching an/or parsing is performed at one location, possibly the user machine, while the address translation is performed at a remote machine.

In a preferred embodiment of the invention, a resident portion of the translator is activated whenever the browser is started. In a preferred embodiment of the invention, the resident translator can communicate with external sites for many purposes including, automatic version update of the translator and/or indexes and/or tables; uploading client related information, such as use statistics and site access statistics; download advertising material to be displayed at various times; and resolve problems using an external service.

In a preferred embodiment of the invention, the local translator portion provides language support for native language address entry, even if the browser and/or operating system do not.

Figure 7:
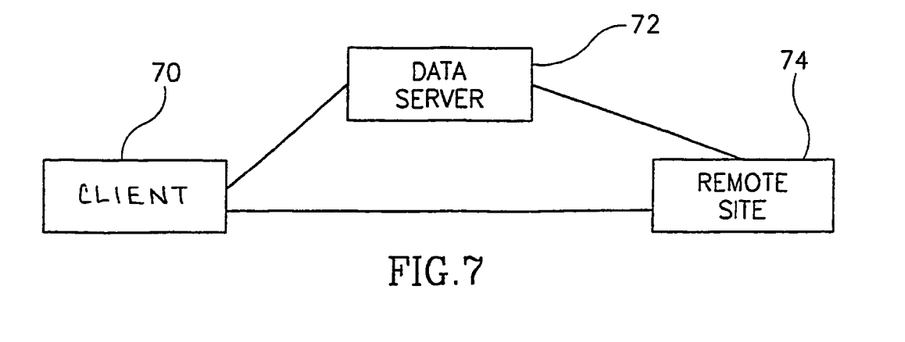
FIG. 7 is a schematic block diagram of a configuration including a client, a data server and a remote site, in accordance with a preferred embodiment of the invention.

FIG. 7 is a schematic block diagram of a configuration including a client 70, a data server 72 and a remote site 74, in accordance with a preferred embodiment of the invention. A resident translator portion at client 70 preferably maintains the connection with data server 72. In one preferred embodiment of the invention, data server 72 transmits advertisements to the client. Alternatively or additionally, data server 72 transmits polls (for user response) to client 70. Preferably, server 72 receives the responses to the polls directly through the translator and not through a remote site. Alternatively, the polls are displayed in the browser as WWW pages, rather than as separate windows.

In accordance with another preferred embodiment of the invention, data server 72 can be used as an intermediate between client 70 and remote site 74, for the transfer of money. In a typical situation, if client 70 desires to make a purchase at remote site 74, he will be required to transmit credit card details over an insecure link (the Internet). Preferably, client 70 performs the purchase through data server 72, to which the credit card details have been previously downloaded and/or transmitted using a secure channel. The client transmits a product number and a remote site address to the data server and the data server performs the money transfer, preferably using a secure connection, but possibly using other means, for example, through a bank and/or a fax machine. Preferably, data server 72 verifies the identity of client 70, using a portion of the translator resident at client 70. In a preferred embodiment of the invention, the purchase is performed mostly automatically, by a user indicating to the resident portion of the translator, which product he wishes to purchase, preferably using a pointing device.

In a preferred embodiment of the invention, the translator adds icons and/or menus to the browser and/or overlays them on the browser window. Thus, functionality may be added to the browser. Additionally or alternatively to adding a button for purchasing, other buttons may be added, including, for example for sending e-mail to a site owner. Such additional functionalities preferably utilize information stored in the database, for example, the e-mail address of the site owner.

In a preferred embodiment of the invention, especially where the translator acts as a proxy server, the translator may be used to exercise parental control over the use of the client computer, for example to limit access to pornographic sites and/or money-spending sites. Preferably, the translator does not allow certain addresses to be translated. Preferably, each client has associated therewith a list of allowed web sites, a list of proscribed web sites and/or a site rating, below which, access is allowed and above which, access is not allowed. The translator preferably includes or connects to a service that provides ratings for sites and/or domain names.

In a preferred embodiment of the invention, the translator performs password entry for sites that require a password. Instead of a user being required to recall a separate password and/or user name for each service to which he subscribes, when the user enters input associated with that site, the translator automatically enters the user name and/or password. Different nicknames may be associated with different users for the same page. Preferably, the page with the password entry is also displayed to the user, but without requiring any input. Preferably, the passwords are maintained on the client machine, due to their sensitivity. Alternatively or additionally, a user is required to enter a single password in order to activate this feature.

In a preferred embodiment of the invention, the translator is embodied as a remote translation service, with a local resident portion. Preferably, the remote portion is maintained as a network of hierarchical translation servers. In a preferred embodiment of the invention, the remote portion preferably includes a computer, a user information database, a site-owner information database, a search engine which searches the site-owner information data base, a HTTP server, a HTML generator and a client response portion, which controls the other components of the server, responsive to input received from the client.

In a preferred embodiment of the invention, the client portion of the translator is embodied as a program that masquerades as a HTTP handler for the browser. Preferably, the translator registers itself as the HTTP handler. When the browser requests a page, the resident translator handles the translation, through the Internet and/or using a local database of association, and then commands the browser, preferably through a DDE/OLE connection to obtain the particular page. Preferably, the local database includes user specific associations and/or is a cache of recently and/or commonly used addresses. Preferably, when a user requests a specific page, his local database is updated, preferably by a remote translator portion, to reflect an association between that particular choice and the information entered. In some browsers, entry of a free-form URL will automatically cause a search-site to be connected to. Preferably, the resident portion of the translator captures such requests and performs a translation instead.

In some embodiments of the invention, words in the free-form input will be separated by a separator other than a blank, so that the browser does not cause problems with the existence of blanks in what is supposed to be a URL.

In a preferred embodiment of the invention, sites are manually registered with the translation service. A site-owner fills out a form, preferably on the Internet, and requests that the translator recognize a particular site. Preferably, the site owner suggests key words to be used in indexing. Alternatively, the owner of the translator enters this information. Alternatively, the translator automatically identifies domains and generates index terms for the domains. Preferably, the site-owner database is update able by the site owners, to add indexing terms. Alternatively, if a large number of users indicate that they identify a particular site with particular index terms and/or keywords, this information is preferably entered into the site-owner database. A preferred way of making such an indication is by accumulating the choices made by users that entered partial information and received a list of possible sites. The site which is most often chosen for a particular group of key words is preferably made the default choice (preferably, providing that the user does not have a personal selection).

In a preferred embodiment of the invention, users may also register by filing out an automated form.

It should be appreciated that the present invention has been described mostly with relation to Web browsers. However, in other preferred embodiments of the invention, the methods and apparatus described herein may be applied to other types of Internet applications, which require domain name resolution, such as News services and FTP services. In addition, these methods may be applied to translating domain name portions of e-mail addresses. However, in e-mail name translation, the aspect of directly accessing data of some embodiments of the invention, may not apply. Additionally, although some software elements are described herein as including a plurality of modules, it should be appreciated that these modules may be merged and/or sub-divided into modules, in some embodiments of the present invention.

It should be appreciated that the above described methods of address manipulation, as described hereinabove contain many features, not all of which need be practiced in all embodiments of the invention. Rather, various embodiments of the invention will utilize only some of the above described techniques, features or methods and or combinations thereof. In addition, although the above description is focused on methods, apparatus for performing these methods is also considered to be within the scope of the invention.

It will be appreciated by a person skilled in the art that the present invention is not limited by what has thus far been described. Rather, the present invention is limited only by the claims which follow. When used in the following claims, the terms "comprises", "comprising", "includes", "including" or the like means "including but not limited to".

The invention claimed is:

1. A method of WWW page retrieval from a web site, comprising:
   receiving information associated with content of a web site, wherein said received information is not a WWW address and comprises characters typed for entry by a user into a URL entry field in a browser operable on an electronic device having web browsing capabilities in which a standard URL address would be entered;
   said information being received by a software not associated with said web site;
   determining a geographical location of the user;
   providing a page address of a page of said web site, responsive to said information and said determined geographical location, by said software;
   sending the page address to the browser for retrieving said page responsive to said page address; and
   thereby causing said page to be directly displayed to the user using the browser, without any additional user intervention beyond the entry of said information.

2. A method according to claim 1, wherein providing the page address comprises performing an automated web search.

3. A method according to claim 1, wherein said information is in a non-Latin language.

4. A method according to claim 1, wherein said provided page address is selected from multiple matching sites.

5. A method according to claim 1, wherein determining the geographic location comprises determining based on the user entering location information.

6. A method according to claim 1, wherein determining the geographic location comprises determining based on the user entering the location at the time of configuration.

7. A method according to claim 1, wherein determining the geographic location comprises determining based on the user entering the location during a session in which the information is entered.

8. A method according to claim 1, wherein providing a page address comprises providing an address of a page whose content is associated with the determined geographic location.

9. A method of WWW page retrieval from a web site, comprising:
   receiving information associated with content of a web site, wherein said received information is not a WWW address and comprises characters typed for entry by a user into a URL entry field in a browser operable on an electronic device having web browsing capabilities, in which a standard URL address would be entered;
   said information being received by a software not associated with said site;
   analyzing said information to correct spelling in said information to a spelling-corrected input;
   providing a page address of a page of said site, responsive to said spelling corrected input, by said software;
   sending the page address to the browser for retrieving said page responsive to said page address; and
   thereby causing said page to be directly displayed to the user using the browser, without any additional user intervention beyond the entry of said information,
   wherein said page address is determined using a database of associations, said database is at least logically associated with a particular user, and said database includes user information regarding a particular user, which user information is entered by said user, which page is selected for display responsive to said user information and wherein said database is stored at a location remote from where said information received by said software is entered by the user for display of said page.

10. A method according to claim 9, wherein said information is entered into a window overlaying said browser.

11. A method according to claim 10, wherein said window is overlaying a location window of said browser.

12. A method according to claim 9, wherein said providing the page address comprises retrieving information about a site from a location, and comprising updating of said information by an operator of said site.

13. A method according to claim 9, wherein providing a page address comprises providing responsive to a popularity level of said page.

14. A method according to claim 9, wherein providing a page address comprises providing based upon statistical information correlating said entered information and websites.

15. A method according to claim 9, including adding a user interface functionality to said browser, which functionality is used for interaction with said site.

16. A method according to claim 15, wherein said interface comprises icons.

17. A method according to claim 15, wherein said interface comprises one or more menus.

18. A method according to claim 15, wherein said functionality comprises a purchase function.

19. A method according to claim 15, wherein said functionality operates based on information stored in a database.

20. A method according to claim 19, wherein said database contains information arranged by site.

21. A method according to claim 9, wherein said information does not meet domain name specifications.

22. A method according to claim 9, wherein said information does not meet URL specifications.

23. A method according to claim 9, wherein said information comprises a plurality of words.

24. A method according to claim 9, wherein said information comprises a field identifier and a field-match value.

25. A method according to claim 9, wherein said information is associated with an owner of the site.

26. A method according to claim 25, wherein said information comprises a partial street address of said owner.

27. A method according to claim 25, wherein said information comprises a telephone number of said owner.

28. A method according to claim 9, wherein correcting spelling comprises correcting at least one transliteration error.

29. A method according to claim 9, wherein analyzing comprises applying natural language recognition on said information.

30. A method according to claim 9, wherein analyzing comprises blocking access to certain types of sites.

31. A method according to claim 9, wherein said analyzing is performed locally, where said page is displayed.

32. A method according to claim 9, wherein said analyzing is performed remotely from where said page is displayed.

33. A method according to claim 9, wherein said analyzing comprises determining a one-to-one mapping between said information and a translation.

34. A method according to claim 9, wherein said information is entered in a language not supported by said browser.

35. A method according to claim 9, wherein said information is entered in a font not supported by said browser.

36. A method according to claim 9, wherein said thereby causing of directly displaying said page comprises automatically providing password information for accessing said page.

37. A method according to claim 36, wherein a plurality of such passwords are stored in a password database associated with said user.

38. A method according to claim 9, wherein said provided page address is selected from multiple matching sites.

39. A method of WWW page retrieval from a web site, comprising:
- receiving information associated with content of a web site, wherein said received information is not a WWW address and comprises characters typed for entry by a user into a URL entry field in a browser operable on an electronic device having web browsing capabilities, in which a standard URL address would be entered;
- said information being received by a software not associated with said site, along with user-dependent information not entered by the user in a session in which said received information is entered by the user;
- analyzing said received information using user-dependent information other than said received information entered by the user;
- providing a page address of a page of said site, responsive to said received information entered by the user and said analysis, by said software;
- sending the page address to the browser for retrieving said page responsive to said page address; and
- thereby causing said page to be directly displayed to the user using the browser, without any additional user intervention beyond the entry of said information,
- wherein said user-dependent information includes at least one of geographical location of the user, the user belonging to a certain customer club, the user profile, the user age, and the user browsing habits.

40. A method according to claim 39, wherein providing the page address comprises performing an automated web search.

41. A method according to claim 39, wherein said information is in a non-Latin language.

42. A method according to claim 39, wherein said provided page address is selected from multiple matching sites.

* * * * *